United States Patent
Murata et al.

(10) Patent No.: US 10,908,373 B2
(45) Date of Patent: Feb. 2, 2021

(54) OPTICAL FIBER RIBBON, OPTICAL FIBER CABLE, AND METHOD OF MANUFACTURING OPTICAL FIBER RIBBON

(71) Applicant: FUJIKURA LTD., Tokyo (JP)

(72) Inventors: Akira Murata, Sakura (JP); Mizuki Isaji, Sakura (JP); Tomoaki Kaji, Sakura (JP); Yoshie Sajima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/337,873

(22) PCT Filed: Sep. 28, 2017

(86) PCT No.: PCT/JP2017/035147
§ 371 (c)(1),
(2) Date: Mar. 28, 2019

(87) PCT Pub. No.: WO2018/062365
PCT Pub. Date: Apr. 5, 2018

(65) Prior Publication Data
US 2020/0026013 A1    Jan. 23, 2020

(30) Foreign Application Priority Data
Sep. 30, 2016  (JP) ................ 2016-194548

(51) Int. Cl.
*G02B 6/44* (2006.01)
*C03C 25/1065* (2018.01)

(52) U.S. Cl.
CPC ........ *G02B 6/4403* (2013.01); *C03C 25/1065* (2013.01); *G02B 6/443* (2013.01)

(58) Field of Classification Search
None
See application file for complete search history.

(56) References Cited

U.S. PATENT DOCUMENTS 6,004,675 A * 12/1999 Akasaka .............. C03C 25/106
                                                              385/127
6,804,442 B1 * 10/2004 Watanabe .......... G02B 6/02395
                                                              385/128
(Continued)

FOREIGN PATENT DOCUMENTS

CN    103827719 A    5/2014
JP    S62202842 A    9/1987
(Continued)

OTHER PUBLICATIONS

International Telecommunication Union Telecommunication Standardization Sector of ITU (ITU-T), Series G: Transmission Systems and Media, Digital Systems and Networks, G.652, dated Nov. 2016 (28 pages).

(Continued)

*Primary Examiner* — Tina M Wong
(74) *Attorney, Agent, or Firm* — Osha Bergman Watanabe & Burton LLP

(57) ABSTRACT

An optical fiber ribbon is formed by connecting a plurality of optical fiber colored core wires to each other with a connector formed of a UV curable resin. Each of the optical fiber colored core wires includes: a bare optical fiber; a primary layer that comprises a UV curable resin that covers the bare optical fiber; a secondary layer that comprises a UV curable resin that covers the primary layer; and a colored layer disposed outside the secondary layer and that comprises a colored UV curable resin. The primary layer has a Young's modulus that is greater than or equal to 75% of a saturated Young's modulus of the primary layer.

8 Claims, 2 Drawing Sheets

(56) References Cited

U.S. PATENT DOCUMENTS

| | | | | |
|---|---|---|---|---|
| 6,907,175 | B2* | 6/2005 | Suzuki | C03C 25/1065 385/126 |
| 9,097,867 | B2* | 8/2015 | Tachibana | G02B 6/44 |
| 2003/0053781 | A1* | 3/2003 | Fabian | C03C 25/1065 385/128 |
| 2005/0226573 | A1* | 10/2005 | Okuno | G02B 6/02004 385/114 |
| 2006/0088263 | A1 | 4/2006 | Tanaka et al. | |
| 2008/0131062 | A1* | 6/2008 | Sendai | C03C 25/1065 385/100 |
| 2011/0274396 | A1 | 11/2011 | Nakajima et al. | |
| 2011/0274397 | A1 | 11/2011 | Weimann et al. | |
| 2013/0266281 | A1* | 10/2013 | Tanaka | G02B 6/4482 385/128 |
| 2013/0302003 | A1* | 11/2013 | Bookbinder | C08G 18/10 385/128 |
| 2013/0343717 | A1* | 12/2013 | Tachibana | C03C 25/106 385/141 |
| 2014/0226941 | A1* | 8/2014 | Tanaka | G02B 6/4403 385/114 |
| 2014/0301704 | A1 | 10/2014 | Tanaka et al. | |
| 2015/0293325 | A1 | 10/2015 | Kasahara et al. | |
| 2017/0285287 | A1* | 10/2017 | Murata | B29D 11/00721 |
| 2019/0250347 | A1* | 8/2019 | Fallahmohammadi | C03C 25/1065 |
| 2020/0026012 | A1* | 1/2020 | Murata | G02B 6/443 |
| 2020/0026013 | A1* | 1/2020 | Murata | G02B 6/4403 |

FOREIGN PATENT DOCUMENTS

| | | |
|---|---|---|
| JP | H01212255 A | 8/1989 |
| JP | H04338139 A | 11/1992 |
| JP | H07069686 A | 3/1995 |
| JP | H07267687 A | 10/1995 |
| JP | H07277775 A | 10/1995 |
| JP | H09002844 A | 1/1997 |
| JP | 2004012679 A | 1/2004 |
| JP | 2005162522 A | 6/2005 |
| JP | 2006084770 A | 3/2006 |
| JP | 2006113448 A | 4/2006 |
| JP | 2011128377 A | 6/2011 |
| JP | 2012234122 A | 11/2012 |
| JP | 2013082594 A | 5/2013 |
| JP | 2013134477 A | 7/2013 |
| JP | 2015086087 A | 5/2015 |
| KR | 10-2014-0079824 A | 6/2014 |

OTHER PUBLICATIONS

International Telecommunication Union Telecommunication Standardization Sector of ITU (ITU-T), Series G: Transmission Systems and Media, Digital Systems and Networks, G.657, dated Nov. 2016 (24 pages).

International Electrotechnical Commission, Technical Report, "Optical fibres—Measurement methods—Microbending sensitivity," Edition 2.0, Dec. 2012 (28 pages).

Search Report Section of Office Action issued in corresponding Chinese Application No. 201780053298.4 dated May 18, 2020 (2 pages).

Wei Fang, "Optical Fiber Cable Technology and Preparation"; Wuhan: Huazhong University of Science and Technology Press; pp. 153; Mar. 2013 (2 pages).

* cited by examiner

OPTICAL FIBER RIBBON, OPTICAL FIBER CABLE, AND METHOD OF MANUFACTURING OPTICAL FIBER RIBBON

CROSS-REFERENCE TO RELATED APPLICATIONS

This is a national phase application of International Patent Application No. PCT/JP2017/035147 filed on Sep. 28, 2017, which claims priority to Japanese Patent Application No. 2016-194548 filed on Sep. 30, 2016. The full contents of both applications are incorporated herein by reference.

TECHNICAL FIELD

The present invention relates to an optical fiber ribbon, an optical fiber cable, and a method of manufacturing an optical fiber ribbon.

BACKGROUND

Conventionally, an optical fiber ribbon as disclosed in Patent Document 1 is known. This optical fiber ribbon is formed by connecting a plurality of optical fiber colored core wires to each other with connectors. Each of the optical fiber colored core wires includes a bare optical fiber, a primary layer covering the bare optical fiber, a secondary layer covering the primary layer, and a colored layer disposed outside the secondary layer. By forming the primary layer of a soft material having a small Young's modulus, an external force applied to the bare optical fiber can be relieved, and an increase in transmission loss of light due to the external force can be prevented. In addition, by forming the secondary layer disposed outside the primary layer of a hard material having a large Young's modulus, the bare optical fiber and the primary layer can be protected from an external force. Furthermore, the colored layer is colored for discriminating the optical fiber colored core wires from each other.

PATENT DOCUMENTS

[Patent Document 1] Japanese Unexamined Patent Application, First Publication No. 2013-134477

By the way, the above primary layer may be formed of a UV curable resin. In this case, when the UV curable resin to be the primary layer is cured by irradiation with UV light, reliability of the optical fiber ribbon may be deteriorated due to insufficient curing.

SUMMARY

One or more embodiments of the present invention secure reliability of an optical fiber ribbon in which a primary layer is formed of a UV curable resin.

An optical fiber ribbon according to one or more embodiments of the present invention is an optical fiber ribbon formed by connecting a plurality of optical fiber colored core wires to each other with connectors formed of a UV curable resin, in which each of the optical fiber colored core wires includes: a bare optical fiber; a primary layer formed of a UV curable resin covering the bare optical fiber; a secondary layer formed of a UV curable resin covering the primary layer; and a colored layer disposed outside the secondary layer and formed of a colored UV curable resin, and the primary layer has a Young's modulus of 75% or more with respect to a saturated Young's modulus of the primary layer.

According to one or more embodiments of the present invention, it is possible to secure reliability of the optical fiber ribbon in which the primary layer is formed of a UV curable resin.

DETAILED DESCRIPTION

Hereinafter, configurations of an optical fiber ribbon and an optical fiber cable according to one or more embodiments will be described with reference to FIGS. 1 to 3. Note that in FIGS. 1 to 3, the scale is appropriately changed in order to make it possible to recognize the shape of each constituent member.

Figure 1:
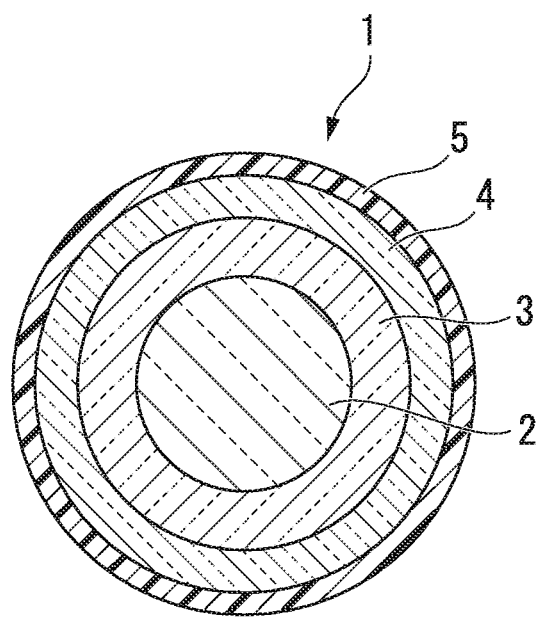
FIG. 1 is a cross-sectional view of an optical fiber colored core wire according to one or more embodiments.

FIG. 1 is a cross-sectional view of an optical fiber colored core wire according to one or more embodiments. As illustrated in FIG. 1, an optical fiber colored core wire 1 includes a bare optical fiber 2, a primary layer 3, a secondary layer 4, and a colored layer 5.

The bare optical fiber 2 is formed of, for example, quartz-based glass and transmits light. The bare optical fiber 2 has, for example, a mode field diameter (MFD) of 8.2 to 9.6 µm in light having a wavelength of 1310 nm. The primary layer 3 is formed of a UV curable resin and covers the bare optical fiber 2. The secondary layer 4 is formed of a UV curable resin and covers the primary layer 3. The colored layer 5 is formed of a colored UV curable resin and is disposed outside the primary layer 3 and the secondary layer 4.

Note that specific materials of the UV curable resins to be the primary layer 3, the secondary layer 4, and the colored layer 5 may be the same as or different from each other. Examples of the UV curable resins include an acrylate resin.

Figure 2:
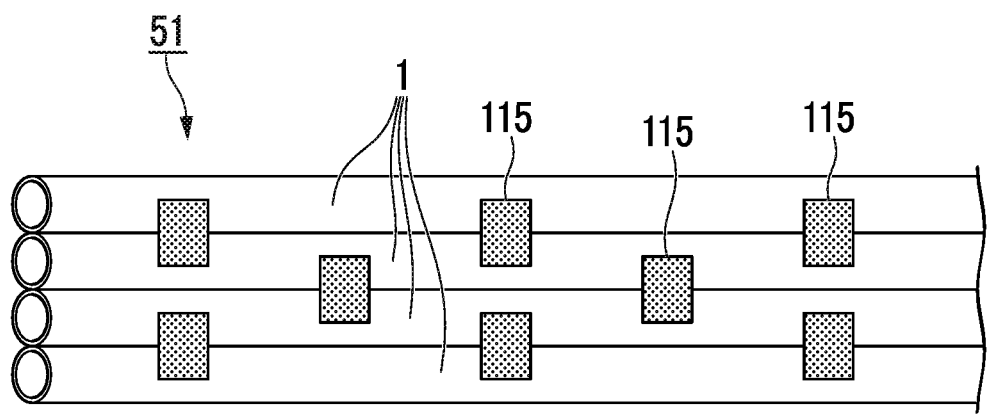
FIG. 2 is a view for explaining a configuration of an optical fiber ribbon according to one or more embodiments.

FIG. 2 is a view for explaining a configuration of an optical fiber ribbon 51 including the optical fiber colored core wire 1 of FIG. 1. As illustrated in FIG. 2, in one or more embodiments, the optical fiber ribbon 51 is formed by connecting a plurality of the optical fiber colored core wires 1 to each other with connectors 115 disposed at intervals. More specifically, the plurality of optical fiber colored core wires 1 is arranged, and the adjacent optical fiber colored core wires 1 are connected to each other by the connectors 115. Hereinafter, a direction in which the optical fiber colored core wire 1 extends is referred to as a longitudinal direction, and a direction in which the plurality of optical fiber colored core wires is arranged is referred to as a width direction. The width direction is orthogonal to the longitudinal direction. The connectors 115 are disposed in the longitudinal direction of the optical fiber colored core wire 1 at regular intervals. With respect to a position of a connector 115 connecting adjacent optical fiber colored core wires 1 to each other, a connector 115 connecting one of the adjacent optical fiber colored core wires 1 to another optical fiber colored core wires 1 adjacent thereto is disposed at a position shifted in the longitudinal direction. In this manner, the connectors 115 are disposed in a staggered manner in the width direction and the longitudinal direction.

By forming the optical fiber ribbon 51 as illustrated in FIG. 2, the optical fiber ribbon 51 can be rolled to form a tubular shape or folded. Therefore, the plurality of optical fiber colored core wires 1 can be bundled at high density. Furthermore, the adjacent optical fiber colored core wires 1 are connected to each other by the connectors 115 disposed at intervals in the longitudinal direction. Therefore, by peeling some of the connectors 115, a specific optical fiber colored core wire 1 can be easily taken out.

The connector 115 is formed of a UV curable resin. In the example of FIG. 2, the optical fiber ribbon 51 includes four optical fiber colored core wires 1, but the optical fiber ribbon 51 may be formed using five or more optical fiber colored core wires 1.

The optical fiber ribbon 51 can be used for a loose tube cable, a slot type cable, a ribbon type center tube cable, a wrapping tube cable, a micro duct cable, and the like. The micro duct cable is a type of loose tube cable and is obtained by packing optical fibers at high density in a loose tube having a small diameter. Due to such a structure, relatively strong side pressure acts on the optical fiber colored core wire 1 in the loose tube cable, and transmission loss of light may increase due to microbending.

In order to suppress transmission loss of light when side pressure acts and to improve a microbending resistance characteristic, it is effective to form the secondary layer 4 or the colored layer 5 of a hard material and to form the primary layer 3 of a soft material. In this manner, by making the primary layer 3 in contact with the bare optical fiber 2 soft and making the secondary layer 4 or the colored layer 5 located outside the primary layer 3 hard, the bare optical fiber 2 can be effectively protected from an external force. In one or more embodiments, the secondary layer 4 or the colored layer 5 has a Young's modulus of 700 MPa or more and 1400 MPa or less, for example.

Figure 3:
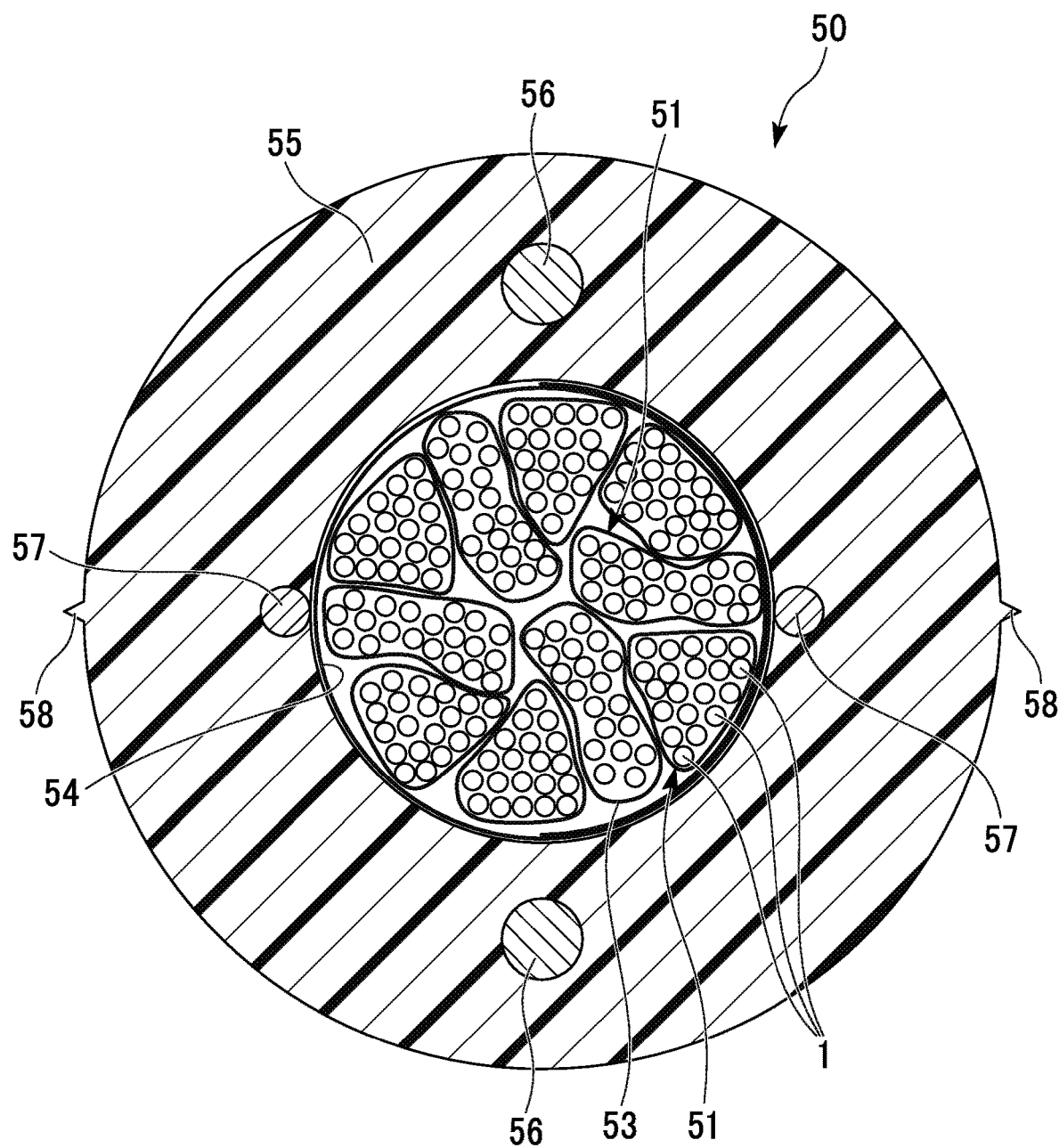
FIG. 3 is a cross-sectional view of an optical fiber cable according to one or more embodiments.

FIG. 3 is a diagram illustrating an example of an optical fiber cable 50 using the optical fiber ribbon 51 according to one or more embodiments. The optical fiber cable 50 includes a plurality of the optical fiber ribbons 51, a binding material 53, a wrapping tube 54, a cylindrical sheath 55, a pair of tension-resisting members 56, and a pair of tear cords 57.

The binding material 53 bundles the optical fiber ribbons 51. The wrapping tube 54 covers the optical fiber ribbons 51 bundled by the binding material 53. The sheath 55 coats the optical fiber ribbons 51 together with the wrapping tube 54. The pair of tension-resisting members 56 is buried in the sheath 55. The pair of tear cords 57 is buried in a position close to an inner peripheral surface in the sheath 55. A marker protrusion 58 protrudes from an outer peripheral surface of the sheath 55 at an outside of each of positions where the pair of tear cords 57 is disposed. The marker protrusion 58 is formed along the tear cord 57 and indicates a position in which the tear cord 57 is buried. Note that the optical fiber cable 50 does not need to include the wrapping tube 54, the tension-resisting member 56, the tear cord 57, or the marker protrusion 58. In addition, the optical fiber cable 50 may include only one optical fiber ribbon 51.

Next, a process of manufacturing the optical fiber cable 50 will be described.

In order to manufacture the optical fiber cable 50, first, a bare wire forming step is performed. In the bare wire forming step, the bare optical fiber 2 is formed. The bare optical fiber 2 is drawn out from a glass preform heated to, for example, about 2000° C., and is formed to have a desired outer diameter. The outer diameter of the bare optical fiber 2 is, for example, about several hundred μm.

Next, a primary layer forming step is performed. In the primary layer forming step, a UV curable resin to be the primary layer 3 is applied around the bare optical fiber 2. Thereafter, the applied UV curable resin is irradiated with UV light to be cured to form the primary layer 3.

Next, a secondary layer forming step is performed. In the secondary layer forming step, a UV curable resin to be the secondary layer 4 is applied around the primary layer 3. Thereafter, the applied UV curable resin is irradiated with UV light to be cured to form the secondary layer 4. Note that by applying a UV curable resin to be the primary layer 3 around the bare optical fiber 2, subsequently applying a UV curable resin to be the secondary layer 4 onto the UV curable resin to be the primary layer 3, and irradiating the UV curable resins with UV light, the primary layer 3 and the secondary layer 4 may be cured collectively. That is, the primary layer forming step and the secondary layer forming step may be performed simultaneously.

Next, a colored layer forming step is performed. In the colored layer forming step, a UV curable resin to be the colored layer 5 is applied around the secondary layer 4. Thereafter, the applied UV curable resin is irradiated with UV light to be cured to form the colored layer 5. As a result, the optical fiber colored core wire 1 is obtained.

Next, a ribbon forming step is performed. In the ribbon forming step, a UV curable resin to be the connector 115 is applied to the plurality of optical fiber colored core wires 1 at a plurality of positions at intervals in the longitudinal direction. Thereafter, the applied UV curable resin is irradiated with UV light to be cured to form the connector 115. As a result, the plurality of optical fiber colored core wires 1 is connected to each other to obtain the optical fiber ribbon 51.

Next, the optical fiber ribbon 51 is housed in the sheath 55 to obtain the optical fiber cable 50.

In this manner, in the process of manufacturing the optical fiber ribbon 51, irradiation with UV light is performed a plurality of times. Here, the inventor of the present application has found that curing of the primary layer 3 may progress even in a step after the primary layer forming step. Specifically, in a case where curing of the primary layer 3 in the primary layer forming step is insufficient, when the primary layer 3 is irradiated with UV light in a subsequent step, the UV light which has passed through the secondary layer 4 and the colored layer 5 is absorbed by the primary layer 3, and curing of the primary layer 3 progresses.

When such a phenomenon occurs, the Young's modulus of the primary layer 3 may become harder than a desired range, an action of relaxing an external force by the primary layer 3 may become insufficient, and transmission loss of light may thereby increase. In addition, due to insufficient curing of the primary layer 3, when water comes into contact with the optical fiber ribbon 51, the primary layer 3 may be peeled off from the bare optical fiber 2, or water bubbles may be interposed between the primary layer 3 and the bare optical fiber 2 to cause side pressure to act on the bare optical fiber 2.

Focusing on the above conditions, transmission loss of light, reliability, and the like of the optical fiber cable 50 have been verified, and a result thereof will be described with reference to Table 1. Note that each of examples illustrated in Table 1 uses the optical fiber colored core wire 1 having MFD of 9.1 μm for light having a wavelength of 1310 nm, an outer diameter of the bare optical fiber 2 of 125 μm, an outer diameter of the primary layer 3 of 190 μm, an outer diameter of the secondary layer 4 of 239 μm, and an outer diameter of the colored layer 5 of 252 μm. This optical fiber colored core wire 1 conforms to G652D or G657A1 defined by, for example, the International Telecommunication Union Telecommunication Standardization Sector (ITU-T). Note that the outer diameters of the primary layer 3, the secondary layer 4, and the colored layer 5 are design values, and the actual dimensions thereof have an error of about ±3 μm. In addition, the dimensions and the like are mere examples, and the results obtained from the examples illustrated in Table 1 can also be applied to the optical fiber colored core wire 1 in which the dimensions and MDF are changed from the above values.

For example, focusing on the primary Young's modulus of Example 1, the primary Young's modulus is 0.50 MPa before coloring, 0.60 MPa after coloring, and 0.63 MPa after ribbonization. The rise in the Young's modulus of the primary layer 3 as the process progresses in this manner means that curing of the primary layer 3 progresses by UV light which has passed through the secondary layer 4 and the colored layer 5. This tendency is common to Examples 1 to 6 and Comparative Examples 1 to 5.

Note that Table 1 illustrates the degree of curing together with each numerical value of primary Young's modulus. The degree of curing is a ratio of the primary Young's modulus to a numerical value of saturated primary Young's modulus

TABLE 1

|  | Example 1 | Example 2 | Example 3 | Example 4 | Example 5 | Example 6 |
|---|---|---|---|---|---|---|
| Primary Young's modulus before coloring [MPa] | 0.50/71% | 0.27/55% | 0.65/74% | 0.16/67% | 0.63/88% | 0.42/68% |
| Primary Young's modulus after coloring [MPa] | 0.60/86% | 0.33/67% | 0.67/76% | 0.18/75% | 0.67/93% | 0.50/81% |
| Primary Young's modulus after ribbonization [MPa] | 0.63/90% | 0.37/75% | 0.72/82% | 0.20/83% | 0.70/97% | 0.56/90% |
| Saturated primary Young's modulus [MPa] | 0.70 | 0.49 | 0.88 | 0.24 | 0.72 | 0.62 |
| Microbending characteristic before coloring [dB/km] | 0.14 | 0.04 | 0.19 | 0.02 | 0.16 | 0.11 |
| Microbending characteristic in colored state [dB/km] | 0.15 | 0.06 | 0.19 | 0.03 | 0.18 | 0.13 |
| Microbending characteristic in ribbon state [dB/km] | 0.15 | 0.07 | 0.22 | 0.04 | 0.20 | 0.14 |
| Cable characteristic | OK | OK | OK | OK | OK | OK |
| Warm water immersion test (60° C.) of ribbon | OK | OK | OK | OK | OK | OK |

|  | Comparative Example 1 | Comparative Example 2 | Comparative Example 3 | Comparative Example 4 | Comparative Example 5 |
|---|---|---|---|---|---|
| Primary Young's modulus before coloring [MPa] | 0.62/78% | 0.70/64% | 0.57/69% | 0.27/45% | 0.12/50% |
| Primary Young's modulus after coloring [MPa] | 0.67/84% | 0.88/80% | 0.59/71% | 0.37/62% | 0.15/62% |
| Primary Young's modulus after ribbonization [MPa] | 0.73/91% | 1.01/92% | 0.61/73% | 0.42/70% | 0.17/71% |
| Saturated primary Young's modulus [MPa] | 0.80 | 1.10 | 0.83 | 0.60 | 0.24 |
| Microbending characteristic before coloring [dB/km] | 0.16 | 0.21 | 0.17 | 0.04 | 0.02 |
| Microbending characteristic in colored state [dB/km] | 0.19 | 0.32 | 0.18 | 0.07 | 0.02 |
| Microbending characteristic in ribbon state [dB/km] | 0.26 | 0.40 | 0.18 | 0.11 | 0.04 |
| Cable characteristic | NG | NG | OK | OK | NG |
| Warm water immersion test (60° C.) of ribbon | OK | OK | NG | NG | NG |

DEFINITION

The "primary Young's modulus" in Table 1 indicates a Young's modulus of the primary layer 3 in each state during a process of manufacturing the optical fiber cable 50. For example, the "primary Young's modulus before coloring" indicates the Young's modulus of the primary layer 3 after the secondary layer forming step. The "primary Young's modulus after coloring" indicates the Young's modulus of the primary layer 3 after the colored layer forming step. The "primary Young's modulus after ribbonization" indicates the Young's modulus of the primary layer 3 after the ribbon forming step.

The Young's modulus of the primary layer 3 is determined by applying shear stress to the primary layer 3 in a state where the bare optical fiber 2 is fixed, measuring a strain, and drawing a stress-strain curve.

described later. For example, in Example 1, the primary Young's modulus before coloring is 0.50 MPa, and the saturated primary Young's modulus is 0.70 MPa. At this time, the degree of curing before coloring in Example 1 can be calculated as 0.50÷0.70≈0.71 (71%). Therefore, in the column of "primary Young's modulus before coloring" in Example 1, a numerical value of 71% meaning the degree of curing is also written together with the numerical value of 0.50 MPa.

The "saturated primary Young's modulus" in Table 1 indicates the saturated Young's modulus of the primary layer 3. More specifically, the "saturated primary Young's modulus" in Table 1 indicates the Young's modulus of the primary layer 3 in a case of performing irradiation with UV light including a wavelength contributing to a curing reaction in an amount sufficient for completely curing the primary layer 3 in a state where a UV curable resin to be the primary layer 3 is applied to the bare optical fiber 2. For example, in the present Example, when a UV curable resin to be the primary layer 3 was irradiated with UV light having a center wavelength of about 365 nm at 1 J/cm², even if the curable resin was further irradiated with UV light, the Young's modulus of the primary layer 3 did not rise. This state is defined as a state in which the primary layer 3 has been completely cured. In addition, the above "degree of curing" is calculated based on this saturated Young's modulus, and therefore is an index indicating how much the primary layer 3 is cured in each state.

The "microbending characteristic" in Table 1 indicates stability of light transmission of the optical fiber colored core wire 1 against side pressure. Specifically, the "microbending characteristic" indicates a value obtained by measuring the magnitude of transmission loss of light passing through the bare optical fiber 2 under conditions that a tension is 1 N, a sandpaper is #360, a length is 600 m, and a bobbin size is φ400 mm in IEC-TR622221 Method-B.

The "cable characteristic" in Table 1 indicates a result obtained by measuring the magnitude of transmission loss of light when an optical fiber cable is manufactured using the optical fiber ribbon 51. Specifically, the "cable characteristic" indicates a result obtained by changing an ambient temperature in a range of −40° C. to +85° C. in an optical fiber cable having 864 optical fiber colored core wires 1. As a result, a case where transmission loss of light having a wavelength of 1550 nm is 0.15 dB/km or less is evaluated to be OK (good), and a case where the transmission loss is larger than 0.15 dB/km is evaluated to be NG (poor).

Incidentally, in a case where a numerical value of the above microbending characteristic is large, the transmission loss of light tends to increase by applying side pressure to the optical fiber colored core wire 1. Therefore, the cable characteristic is also likely to be deteriorated. For example, in Comparative Example 2, a numerical value of "microbending characteristic in a ribbon state" is 0.40 dB/km, which is the largest in Table 1, and a test result of the "cable characteristic" is also poor.

The "ribbon 60° C. warm water immersion test" in Table 1 indicates stability of the optical fiber ribbon 51 against water. Specifically, the optical fiber ribbon 51 having twelve optical fiber colored core wires 1 was immersed in warm water at 60° C. for one month. While the optical fiber ribbon 51 is immersed in warm water or after the optical fiber ribbon 51 is taken out from warm water, a case where transmission loss of light having a wavelength of 1550 nm is 0.05 dB/km or less is evaluated to be OK (good), and a case where the transmission loss is larger than 0.05 dB/km is evaluated to be NG (poor).

(Primary Young's Modulus After Ribbonization)

Next, an optimal numerical range of the primary Young's modulus after ribbonization will be considered.

In a case where the primary Young's modulus after ribbonization is high, relaxation of an external force applied to the bare optical fiber 2 is insufficient when the external force is applied to the optical fiber colored core wire 1 in a form of a cable, and transmission loss of light increases. In addition, also in a case where the primary Young's modulus after ribbonization is excessively low, the primary layer 3 to which an external force has been applied is largely deformed, relaxation of the external force applied to the bare optical fiber 2 is thereby insufficient, and transmission loss of light increases. Therefore, the optimum numerical range of the primary Young's modulus after ribbonization can be judged from a test result of the cable characteristic.

First, in Table 1, attention is focused on Example 3 and Comparative Example 1 in which the values of the primary Young's modulus after ribbonization are relatively large. In Example 3 in which the primary Young's modulus after ribbonization is 0.72 MPa, the test result of the cable characteristic is good. On the other hand, in Comparative Example 1 in which the primary Young's modulus after ribbonization is 0.73 MPa, which is the second largest after the value in Example 3, the test result of the cable characteristic is poor. From this result, in one or more embodiments, the primary Young's modulus after ribbonization is 0.72 MPa or less.

Next, in Table 1, attention is focused on Example 4 and Comparative Example 5 in which the values of the primary Young's modulus after ribbonization are relatively small. In Example 4 in which the primary Young's modulus after ribbonization is 0.20 MPa, the test result of the cable characteristic is good. On the other hand, in Comparative Example 5 in which the primary Young's modulus after ribbonization is 0.17 MPa, which is the second smallest after the value in Example 4, the test result of the cable characteristic is poor. From this result, in one or more embodiments, the primary Young's modulus after ribbonization is 0.20 MPa or more.

From the above consideration, in one or more embodiments, the primary Young's modulus after ribbonization is 0.20 MPa or more and 0.72 MPa or less.

(Ratio of Primary Young's Modulus After Ribbonization to Saturated Primary Young's Modulus)

Next, an optimum numerical range of a ratio of the primary Young's modulus after ribbonization to the saturated primary Young's modulus (hereinafter simply referred to as "the degree of curing after ribbonization") will be considered.

In a case where the degree of curing after ribbonization is low, when a ribbon 60° C. warm water immersion test is performed, water comes into contact with the optical fiber ribbon 51, the primary layer 3 is thereby peeled off from the bare optical fiber 2, and transmission loss of light increases. Therefore, the optimum numerical range of the degree of curing after ribbonization can be judged from a result of the ribbon 60° C. warm water immersion test.

In Table 1, attention is focused on Example 2 and Comparative Example 3 in which the values of the degree of curing after ribbonization are relatively small. In Example 2 in which the degree of curing after ribbonization is 75%, the result of the ribbon 60° C. warm water immersion test is good. On the other hand, in Comparative Example 3 in which the degree of curing after ribbonization is 73%, which is the second smallest after the value in Example 2, the result of the ribbon 60° C. warm water immersion test is poor. From this result, in one or more embodiments, the degree of curing after ribbonization is 75% or more.

Note that the maximum value of the degree of curing after ribbonization in Table 1 is 97% in Example 5. In a case where the degree of curing after ribbonization is larger than 97%, it is considered that peeling of the primary layer 3 from the bare optical fiber 2 can be suppressed more reliably. Therefore, the degree of curing after ribbonization may be larger than 97%.

(Saturated Primary Young's Modulus)

Next, an optimal numerical range of the saturated primary Young's modulus will be considered.

Focusing on Comparative Example 2 in Table 1, the degree of curing after ribbonization is 92%, which is relatively large, but the cable characteristic is poor. It is considered that this is because the saturated primary Young's modulus is 1.10 MPa, which is relatively large, and a hard material is used as the primary layer 3.

Here, in Table 1, the saturated primary Young's modulus in Example 3 is 0.88 MPa, which is the second largest after the value in Comparative Example 2, and the cable characteristic of Example 3 is good.

From this result, in one or more embodiments, the saturated Young's modulus of the primary layer 3 is 0.88 MPa or less.

As described above, in one or more embodiments, the Young's modulus of the primary layer 3 in a state where the plurality of optical fiber colored core wires 1 is connected to each other to form the optical fiber ribbon 51 is 75% or more with respect to the saturated Young's modulus of the primary layer 3. This makes the degree of curing of the primary layer 3 in a state of the optical fiber ribbon 51 reach a sufficient degree to satisfy the characteristics of the optical fiber ribbon 51. This makes it possible to suppress peeling of the primary layer 3 from the bare optical fiber 2 when the optical fiber ribbon 51 comes into contact with water. Therefore, it is possible to suppress an increase in transmission loss of light generated by contact of the optical fiber ribbon 51 with water to secure reliability.

In a case where the primary layer 3 is formed of a material having a saturated Young's modulus of 0.88 MPa or less, even if the primary layer 3 is further cured after the primary layer forming step, the primary layer 3 has sufficient softness to satisfy the characteristics of the optical fiber ribbon 51. Therefore, it is possible to relax an external force transmitted to the bare optical fiber 2 to secure a microbending resistance characteristic.

By setting the Young's modulus of the primary layer 3 in a form of the optical fiber ribbon 51 to 0.72 MPa or less, it is possible to suppress transmission loss of light generated when side pressure is applied to the optical fiber colored core wire 1 and to secure a microbending resistance characteristic. By setting the Young's modulus to 0.20 MPa or more, it is possible to suppress insufficient relaxation of an external force applied to the bare optical fiber 2 due to excessive softness of the primary layer 3.

By setting the Young's modulus of the secondary layer 4 or the colored layer 5 to 700 MPa or more and 1400 MPa or less, it is possible to protect the primary layer 3 and the bare optical fiber 2 from an external force, an impact, and the like.

In one or more embodiments, the optical fiber cable 50 is manufactured using the optical fiber ribbon 51 in which the degree of curing of the primary layer 3 after ribbonization is 75% or more. As a result, for example, even when water infiltrates into the sheath 55, peeling of the primary layer 3 from the bare optical fiber 2 can be suppressed, and reliability of the optical fiber cable 50 can be secured.

Note that the technical scope of the present invention is not limited to the above embodiments, and various modifications can be made without departing from the gist of the present invention.

For example, the optical fiber colored core wire 1 including the secondary layer 4 and the colored layer 5 has been described in the above embodiments. However, by causing the colored layer 5 to function also as the secondary layer 4, the primary layer 3 and the colored layer 5 may be adjacent to each other. In this case, the primary Young's modulus before coloring refers to the Young's modulus of the primary layer 3 after the primary layer forming step.

In the optical fiber ribbon 51 of the embodiments described above, the connectors 115 are arranged in a staggered manner as illustrated in FIG. 2, but the present invention is not limited thereto. For example, the connectors 115 do not need to be arranged in a staggered manner, or the connectors 115 may integrally cover the plurality of optical fiber colored core wires 1.

Besides, it is possible to appropriately replace the constituent elements in the above embodiments with well-known constituent elements, and the above embodiments and modifications may be appropriately combined without departing from the gist of the present invention. Accordingly, the scope of the invention should be limited only by the attached claims.

DESCRIPTION OF REFERENCE NUMERALS

1: Optical fiber colored core wire
2: Bare optical fiber
3: Primary layer
4: Secondary layer
5: Colored layer
50: Optical fiber cable
51: Optical fiber ribbon
54: Wrapping tube
55: Sheath
56: Tension-resisting member
115: Connector

The invention claimed is:

1. An optical fiber ribbon comprising:
a plurality of optical fiber colored core wires that are connected to each other with a connector that comprises a UV curable resin, wherein
each of the optical fiber colored core wires comprises:
a bare optical fiber;
a primary layer that comprises a UV curable resin that covers the bare optical fiber;
a secondary layer that comprises a UV curable resin that covers the primary layer; and
a colored layer disposed outside the secondary layer and that comprises a colored UV curable resin, and
the primary layer has a Young's modulus that is greater than or equal to 75% and less than or equal to 97% of a saturated Young's modulus of the primary layer.

2. The optical fiber ribbon according to claim 1, wherein the saturated Young's modulus of the primary layer is less than or equal to 0.88 MPa.

3. The optical fiber ribbon according to claim 1, wherein the Young's modulus of the primary layer is greater than or equal to 0.20 MPa and less than or equal to 0.72 MPa.

4. The optical fiber ribbon according to claim 1, wherein the colored layer has a Young's modulus that is greater than or equal to 700 MPa and less than or equal to 1400 MPa.

5. The optical fiber ribbon according to claim 1, wherein the secondary layer has a Young's modulus that is greater than or equal to 700 MPa and less than or equal to 1400 MPa.

6. An optical fiber cable comprising:
the optical fiber ribbon according to claim 1; and
a sheath that houses the optical fiber ribbon.

7. A method of manufacturing an optical fiber ribbon, comprising:
forming a bare optical fiber;
forming a primary layer by applying a UV curable resin around the bare optical fiber and irradiating the UV curable resin with UV light;
forming a colored layer by applying a UV curable resin around the primary layer and irradiating the UV curable resin with UV light; and
forming an optical fiber ribbon by applying a UV curable resin to a plurality of optical fiber colored core wires, irradiating the UV curable resin with UV light, and curing the UV curable resin to connect the plurality of optical fiber colored core wires to each other, wherein
the primary layer, after forming of the optical fiber ribbon, has a Young's modulus that is greater than or equal to 75% and less than or equal to 97% of a saturated Young's modulus of the primary layer.

8. An optical fiber ribbon comprising:
a plurality of optical fiber colored core wires that are connected to each other with a connector that comprises a UV curable resin, wherein
each of the optical fiber colored core wires comprises:
  a bare optical fiber;
  a primary layer that comprises a UV curable resin that covers the bare optical fiber; and
  a colored layer disposed outside the primary layer and that comprises a colored UV curable resin, and
the primary layer has a Young's modulus that is greater than or equal to 75% and less than or equal to 97% of a saturated Young's modulus of the primary layer.

* * * * *